No. 680,095. Patented Aug. 6, 1901.
W. WELLS.
TOASTER.
(Application filed Jan. 16, 1901.)
(No Model.)
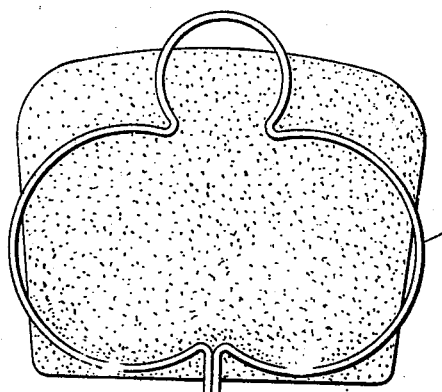
Fig. 1.
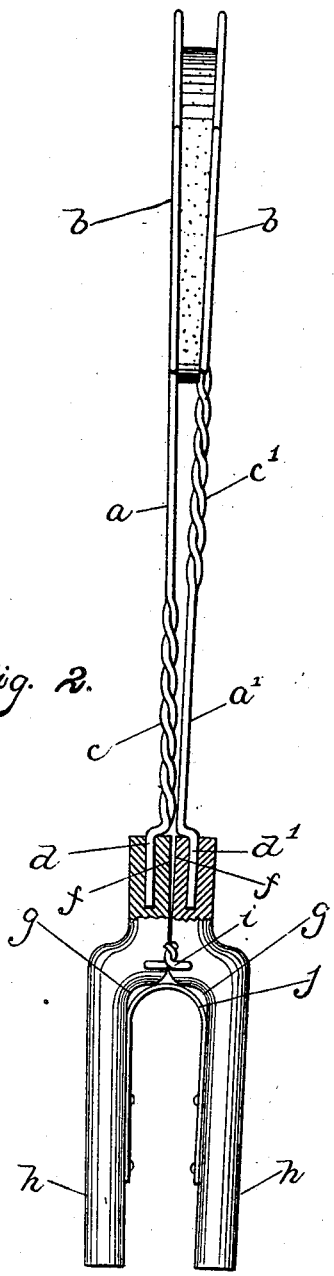
Fig. 2.
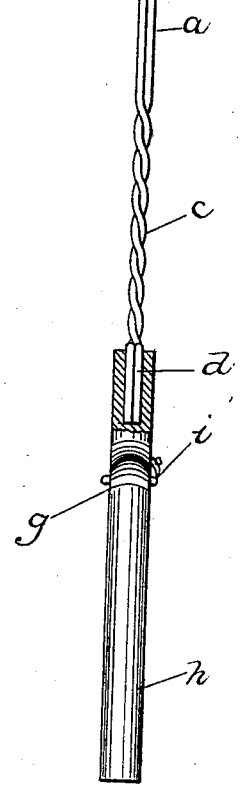
Witnesses.
H. F. Meyer Jr.
F. S. Stitt.
Inventor.
Walter Wells
By
Chas. B. Mann
Attorney.
THE NORRIS PETERS CO., PHOTO-LITHO., WASHINGTON, D. C.

UNITED STATES PATENT OFFICE.

WALTER WELLS, OF BALTIMORE, MARYLAND.

TOASTER.

SPECIFICATION forming part of Letters Patent No. 680,095, dated August 6, 1901.

Application filed January 16, 1901. Serial No. 43,487. (No model.)

*To all whom it may concern:*

Be it known that I, WALTER WELLS, a citizen of the United States, residing at Baltimore, in the State of Maryland, have invented certain new and useful Improvements in Toasters, of which the following is a specification.

My invention is an improvement in toasters for holding bread over a fire; and its object is to provide a cheap and simple device of this character whose arrangement of parts enables the operator to readily release the slice of toasted bread by pressing together the handles of the toaster, thereby avoiding the necessity of handling the heated portions of the latter.

The invention consists in certain constructions and arrangements of the parts hereinafter described and claimed, reference being had to the accompanying drawings, in which—

Figure 1 is an elevation of my improved toaster. Fig. 2 is an elevation thereof at right angles to Fig. 1.

The toaster is provided with two clamping-arms $a\ a'$, each composed of a single length of wire bent at its middle to form a bread-clamping frame $b$, of any preferred design, such as the clover-leaf design shown in the drawings. The arms extend from the clamping-frames to the handles. In order to strengthen the said arms, the two parts of the wire of which they are formed are twisted, but for a portion only of their lengths, as shown at $c\ c'$, Fig. 2, and the twisted portion of each arm lies opposite the plain or untwisted portion of the other arm, so that the two arms may be brought closely together. Each of the wood handle members has at one end an abutting side $f$, a lateral offsetting shoulder $g$ from said abutting side, and a hand-grasp end $h$. The abutting sides of the two handles are normally in contact, and the two lateral offsetting shoulders extend away from each other, and the two handles are pivoted together by a wire loop $i$ near their said offsetting shoulders. The two hand-grasp ends $h$ are parallel but spaced apart, and a flat or plate spring $j$, bent or curved U shape, has each of its two arms rigidly secured to the inner side of a different one of the hand-grasp ends, and the bent or curved part of the spring is close against the lateral offsetting shoulders $g$. By thus rigidly securing the two arms of the plate-spring $j$ to the handle members $h$ where they are spaced apart any twisting strain which may be put upon the pivoted handle members is borne by the spring and not by the pivot-loop, and the durability of the device is thereby increased.

The ends of the two parts of wire forming the arms $a\ a'$ are bent to laterally offset and form a part $d\ d'$ out of alinement but parallel with the remaining portions of the arms, as in Fig. 2, and said ends $d\ d'$ are secured in the abutting ends of the wooden handle members. By thus bending the wire ends $d\ d'$, as shown, the clamping-arms $a\ a'$ are brought flush with the abutting sides of said wood handle members.

In practical operation the hand-grasp ends $h$ of the handle members are pressed together, so as to spread the two frames $b$ apart, and a slice of bread is inserted between said frames and held thereby. When the slice of bread has been toasted, the operator releases it by simply pressing the handles together to spread apart the frames $b$ and slides the toasted slice out upon a plate or the like without the necessity of touching the heated portions of the toaster.

Having thus described my invention, what I claim is—

As a new article of manufacture, a toaster, comprising two clamping-arms, $a$, $a'$, each composed of a single length of wire bent upon itself to form bread-clamping frames; two handle members provided at one end with abutting sides, $f$, and laterally-offsetting shoulders, $g$, extending away from said sides, and the other ends being spaced apart and forming hand-grasps, $h$; a pivot, $i$, connecting said two handle members at the said abutting sides and adjacent said laterally-offsetting shoulders; and a U-shaped spring, $j$, having each of its two arms rigidly secured to the inner side of a different one of said hand-grasp ends, with its curved part close against the said laterally-offsetting shoulders, as set forth.

In testimony whereof I affix my signature in the presence of two witnesses.

WALTER WELLS.

Witnesses:
CHARLES B. MANN, Jr.,
CHARLES L. VIETSCH.